US008851477B2

(12) United States Patent
Ward

(10) Patent No.: US 8,851,477 B2
(45) Date of Patent: Oct. 7, 2014

(54) EDUCATIONAL GAME BOARD

(71) Applicant: Bruce Ward, Santa Monica, CA (US)

(72) Inventor: Bruce Ward, Santa Monica, CA (US)

( * ) Notice: Subject to any disclaimer, the term of this patent is extended or adjusted under 35 U.S.C. 154(b) by 69 days.

(21) Appl. No.: 13/623,013

(22) Filed: Sep. 19, 2012

(65) Prior Publication Data

US 2013/0069307 A1 Mar. 21, 2013

Related U.S. Application Data

(60) Provisional application No. 61/627,107, filed on Sep. 19, 2011.

(51) Int. Cl.
*A63F 3/00* (2006.01)

(52) U.S. Cl.
USPC .......................... 273/287; 273/239; 273/280

(58) Field of Classification Search
USPC .................................. 273/237, 238, 280, 287
See application file for complete search history.

(56) References Cited

U.S. PATENT DOCUMENTS

| | | | | | |
|---|---|---|---|---|---|
| 2,619,349 | A | * | 11/1952 | Abrahamson | 273/238 |
| 3,169,768 | A | * | 2/1965 | Marvin et al. | 273/249 |
| 3,617,063 | A | * | 11/1971 | Dyer et al. | 273/239 |
| 3,630,522 | A | * | 12/1971 | Bear | 463/22 |
| 5,120,065 | A | * | 6/1992 | Driscoll et al. | 273/237 |
| 5,277,429 | A | * | 1/1994 | Smith, III | 463/10 |
| 5,415,411 | A | * | 5/1995 | Peterson | 273/237 |
| 5,445,388 | A | * | 8/1995 | Mitchell | 273/237 |
| 5,460,381 | A | * | 10/1995 | Smith et al. | 273/238 |
| 5,853,327 | A | * | 12/1998 | Gilboa | 463/39 |
| 8,287,338 | B2 | * | 10/2012 | Kim | 463/1 |
| 2008/0237983 | A1 | * | 10/2008 | Chien | 273/260 |
| 2009/0118001 | A1 | * | 5/2009 | Kelly et al. | 463/29 |

OTHER PUBLICATIONS

Hiller, Peter, The Meeting of the Board, Arts & Activities, Jun. 2001, p. 62, vol. 129—Issue 5, Publishers Development Corporation, Carmel, U.S.A.
Chalal, Matthew, New Board Games Uses Race Car to Teach Math, Curriculum Review, Dec. 2008, p. 4, vol. 48—Issue 4, PaperClip Holdings, Pennsylvania, U.S.A.
Cavanagh, Sean, Playing Games in Class Helps Students Grasp Math, Education Digest, Nov. 2008, p. 43-46, vol. 74—Issue 3, Prakken Publications, U.S.A.
Rae, Tushar, A Professor Uses 'Clue,' 'Go,' and Other Games to Intelligence, Chronicle of Higher Education, Apr. 2011, p. A22, vol. 57-Issue 30, U.S.A.
Harris, Christopher, Meet the New School Board, School Library Journal, May 2009, p. 24-26, vol. 55—Issue 5, Media Source, Inc., U.S.A.

* cited by examiner

*Primary Examiner* — Vishu K. Mendiratta
(74) *Attorney, Agent, or Firm* — Cislo & Thomas, LLP

(57) ABSTRACT

An educational device comprising a game board demarcated with a plurality of positions, each position having associated with it and actuator, actuation of which causes the communication device to provide instruction to the player as to what the player is supposed to do. A player can activate a random number generator to determine how many positions to move. Once instruction has been received, the player utilizes game pieces on the game board to execute the instruction. By going through this process, any player can learn a particular skill or gain particular knowledge that can be applied in life.

20 Claims, 2 Drawing Sheets

EDUCATIONAL GAME BOARD

CROSS-REFERENCE TO RELATED APPLICATION

This patent application claims the benefit of U.S. Provisional Patent Application No. 61/627,107, filed Sep. 19, 2011, which application is incorporated in its entirety here by this reference.

TECHNICAL FIELD

This invention relates to an educational device to teach skills or impart knowledge on a player, particularly those who may have a learning disability.

BACKGROUND

According to the U.S. Department of Education, learning disabilities affect approximately 5% of all children enrolled public schools. Some reports indicate that as many as 1 out of 5 people in the United States have a learning disability. Some children with learning disabilities end up in a special class of their own so they can learn at their own pace. However, even with these special classes, these children may still have difficulty learning and retaining certain life skills. One challenge in teaching these children, or any child, and even many adults, is the ability to maintain their attention long enough to teach them a skill or help them gain knowledge. Most people, however, are able to maintain their focus when the task they are focused on is fun and entertaining.

To the inventor's knowledge, there are no versatile fun games that help teach children with learning disabilities learn, gain, and retain a variety of new skills or knowledge applicable in life. For the foregoing reasons there is a need for an educational device that help anybody, particularly those with a learning disability, to learn and acquire a variety of new skills and knowledge that can be used in everyday life.

SUMMARY

The present invention is directed to a device and method that enables a player to learn specific skills or gain specific knowledge applicable in life. The device comprises a game board having marked positions and a plurality of game pieces. In some embodiments, the educational device may comprise player pieces. Each position has associated with it an actuator, actuation of which causes a communication device to give instruction to the player. The player then executes the instruction, which may involve processing of the game pieces. A neutral party may determine whether the instruction was executed correctly. Alternatively, or in addition to, the gameboard may comprise a sensor to detect whether instructions were carried out correctly.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The present invention is directed towards an educational tool 100 and method to help students, pupils, trainees, apprentices, associates, and the like, learn or develop a skill, gain general or special knowledge, or otherwise become proficient, or even an expert, at something he or she was not proficient at doing before, all in a fun and effective manner Although applicable in all areas of life for any user, this tool 100 is particularly effective in teaching those who may be challenged in learning and/or dexterity.

Figure 1:
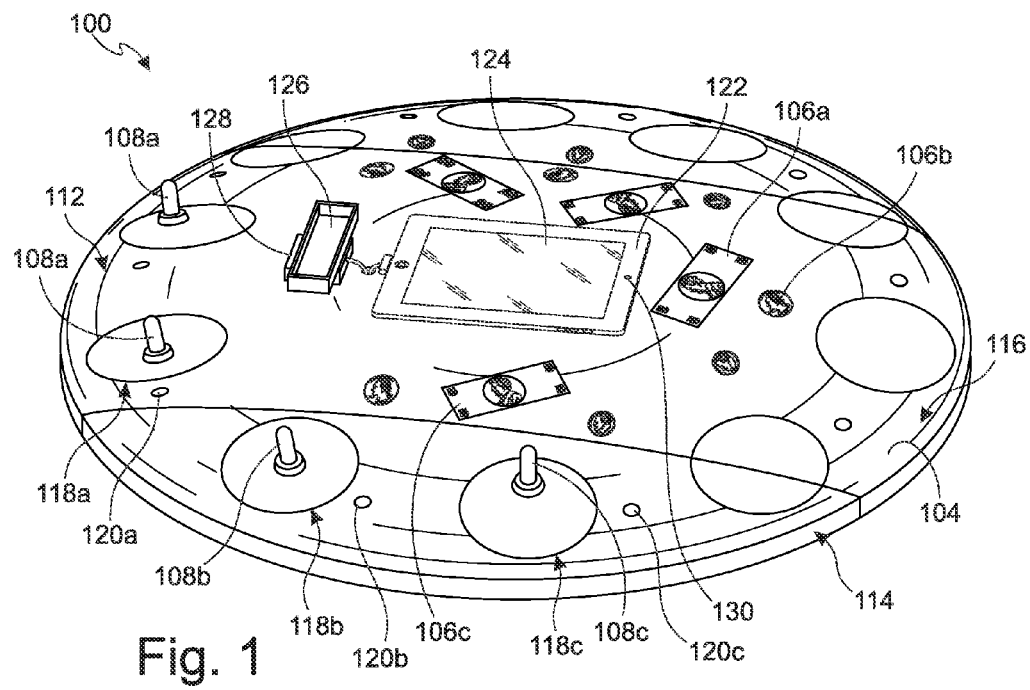
FIG. 1 shows the top perspective view of an embodiment of the present invention.
Figure 2:
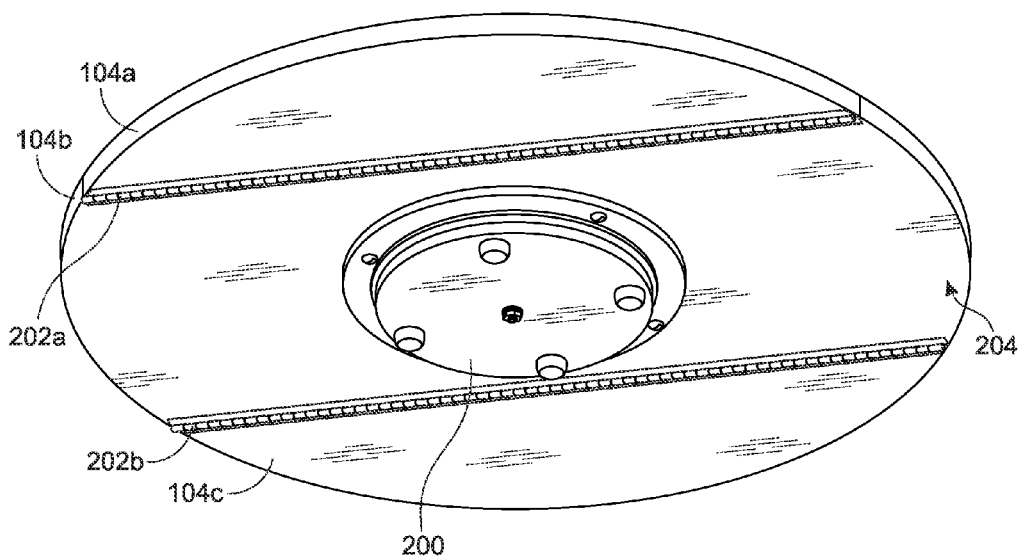
FIG. 2 shows a bottom perspective view thereof.

As shown in FIGS. 1 and 2, in the preferred embodiment, the educational tool 100 comprises a board 104 rotatably mounted on a base 200, a plurality of game pieces 106a, 106b, 106c, etc., and, optionally, a plurality of player pieces 108a, 108b, 108c, etc. Preferably, the board 104 is circular. However, it can be any other shape, such as a triangle, rectangle, square, pentagon, hexagon, heptagon, octagon, and the like. The shape of the board 104 also need not be symmetrical or a regular geometric shape, so long as it has a surface area to play on. Preferably, to improve transportability or storage, the board 104 may be constructed in two or more foldable pieces 104a, 104b, 104c. For example, the two or more pieces 104a, 104b, 104c may be connected by one or more hinges 202a, 202b so as to be foldable into a compact device. In some embodiments, the board 104 may be a single integral piece.

As shown in FIG. 1, in the preferred embodiment, the board 104 comprises a top surface 112 having a center and terminating at at least one perimeter edge 114. For example, if the board 104 is circular, it would be considered as having one continuous perimeter edge 114. A triangular board would be considered as having three edges, a rectangular board with four edges, and so on.

The top surface 112 may be flat or convex to provide a platform upon which the game pieces 106 and player pieces 108 may be set. In some embodiments, the top surface 112 is magnetic. For example, the top surface 112 may be made of a magnet. Alternatively, a large magnet or a plurality of smaller magnets may be placed underneath the top surface 112 with the top surface 112 being made of a material through which the magnetic force can be felt, such as sheet metal. This allows the top surface 112 to be made of or covered with a material that is more suitable or comfortable to play on. For example, the top surface 112 may have a covering 116, such as paint, cloth, canvas, nylon, vinyl, leather, paper, silk, or other synthetic or non-synthetic fabrics and material, and any combination thereof.

Alternatively, instead of magnetizing the top surface 112, the top surface 112 may comprise other means for preventing the game pieces 106 and/or player pieces 108 from falling off the board 104 or other unwanted movement on the board 104. For example, the top surface 112 may comprise an adhesives, hook-n-loop fasteners, non-slip surface, buttons, pegs or holes, and the like, to which the game pieces 106 and/or player pieces 108 may be temporarily and reversibly placed or fastened.

The board 104 also comprises a bottom surface 204 opposite the top surface 112. The bottom surface 204 may be a solid, hard flat piece of material, such as wood, plastic, metal, and the like. The bottom surface 204 allows the top surface 104 to be mounted on the base 200. Preferably, the bottom surface 204 is mounted on the base 200 in a rotatable manner so that, while the base 200 maintains a solid foundation, the top surface 104 can rotate so as to change the orientation of the board 104 relative to the players. This makes it easier for the players to manipulate the game pieces 106 and/or player pieces 108 on the board 104 since the players do not have to move around or reach over the board 104, but rather, simply rotate the board 104 so as to bring pieces 106, 108 within their reach.

The top surface 112 also comprises a plurality of positions 118a, 118b, 118c, etc. (collectively referenced as 118) to designate where the players are to be on the board 104 and where they are to go on their next turn. In the preferred embodiment, the board 104 is circular and the positions 118 are uniformly and angularly spaced apart along the perimeter edge 114 on the top surface 104 as shown in FIG. 1. The plurality of positions 118 may be printed on to the top surface 104 or may be designated by a physical object. Alternatively, the positions 118 may be defined by recesses within the board 104 or protrusions.

Figure 3:
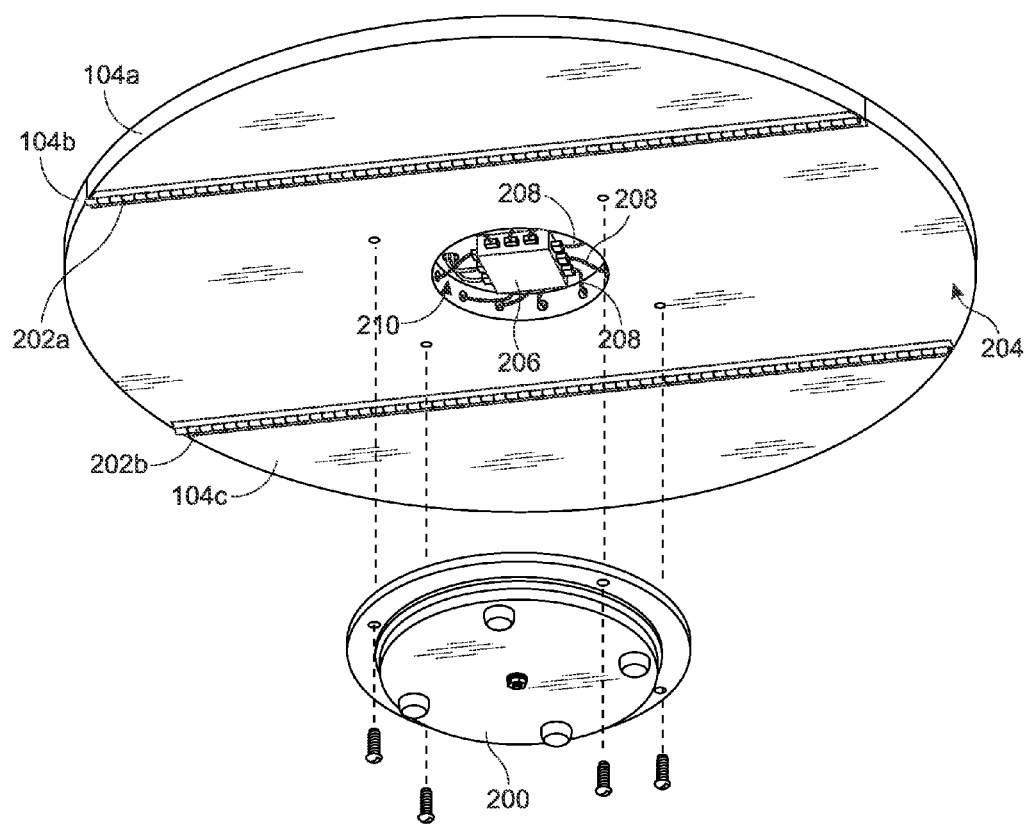
FIG. 3 shows the view in FIG. 2 with the base removed.

Adjacent to each position 118a, 118b, 118c, etc. is at least one actuator 120a, 120b, 120c, etc. (collectively referenced as 120). The actuators 120 may be any device that can activate a communication device 122. For example, the actuators 120 may be buttons, switches, touch sensors, heat sensors, and the like. The communication device 122 may be any audio player, video player, audio-video player, multimedia player, computer, and the like, or any other device that can communicate instructions to the players, such as books, cards, pamphlets, paper, whiteboard, chalkboard, dry erase board, and the like. Thus, the instructions may be given orally, visually, or both. In the event the players cannot read, instructions may be given pictographically using familiar pictures to communicate the instructions. For example, binoculars may be used to represent the words "find," numbers may be shown numerically rather than in written form. The instructions are related to the subject matter for which the players are interested in developing proficiency. Therefore, the instructions may request the player to perform a calculation, solve a problem, perform a sequence of steps, identify a person, place or thing, and the like. Preferably, the instructions involve the players performing some act with the game pieces 106. Each actuator 120a, 120b, 120c, etc. may be operatively connected to the communication device 122 such that actuation of any actuator 120a, 120b, 120c, etc. will cause the communication device 122 to give instruction to the player. For example, as shown in FIG. 3, a bus 206 may be configured to receive communications from the actuators 120 via a plurality of wires 208 (or wirelessly). The bus 206 can be connected to the communication device 122 such that activation of the actuators 120 activates the communication device 122.

A plurality of instructions may be pre-recorded on the communication device 122 such that when an actuator 120 is activated one of the instructions is played to give the player instructions on what to do during his or her turn. In some embodiments, the communication device 122 may be programmable to receive additional instructions or edit previously stored instructions. In some embodiments, the plurality of instructions may be stored in separate electronic files that can be loaded by the players depending on type of game the players want to play. A screen 124 may be provided on the communication device 122 from which the players can select the type of games they want to play from a database of games and/or instructions. In some embodiments, each actuator 120 may be connected to its own communication device 122. Therefore, each communication device will be independent from each other.

If the communication device is purely an audio player, then preferably, the audio player is placed below the top surface 112 so that it cannot be seen or obstruct the game pieces 106 on the top surface 112. In such an embodiment, the top surface 112 or the bottom surface 204 may define a cavity 210 in which the audio device can be housed.

In some embodiments, the communication device 122 may be a video player in which case the video player is placed on the top surface 112 so as to be visible by the players. In the preferred embodiment, the communication device 122 is a multimedia player, such as a computer, tablet, gaming console, and the like. Therefore, the communication device 122 may have an input device, such as keyboard, mouse, game controller, touch screen 124, microphone with voice-recognition software, and the like, or any combination thereof. In some embodiments, the communication device 122 may also serve as or provide a random number generator. Alternatively, the random number generator may be standard die, spinner, and the like. By way of example only, the communication device 122 may be an electronic computing device, such as an iPad® or and iPod Touch® for which an app can be created to perform the functions described herein for the communication device 122.

The instructions can be formatted in a number of different ways. For example, the communication device 122 may comprise a memory storing a list of instructions. Each time an actuator 120 is actuated, the next instruction on the list is given. In some embodiments, the communication device 122 is a computing device comprising a memory and processor that can also keep track of the plays that have been made and the players that have made the plays. Therefore, the instructions given may be dependent on how each player has been performing and the types of instructions that have been given. For example, since the educational tool 100 is designed to improve the players' skill or knowledge the next instruction given to a player may be dependent on how he or she performed on the previous instruction. Thus, the communication device 122 may be configured to keep track of what instructions were given to each player and how well or correctly the player has executed those instructions. With increasing accuracy and proficiency in following instructions, subsequent instructions can become more difficult. Conversely, if a player is having a hard time following instructions, subsequent instructions may become easier.

Returning to the board 104, the top surface 112 may further comprise a receiving portion 126 to receive the game pieces 106 that have been used in play. Preferably, the receiving portion 126 is positioned on the top surface 112 centrally inwardly relative to the plurality of positions 118. This allows the players to move their player pieces 108 along the perimeter of the game board 104 and place or discard any used game pieces 106 towards the center of the board 104 so as not to interfere with the regular play of the game. For example, the receiving portion 126 may be at or near the center of the board 104. However, the receiving portion 126 can be placed anywhere, including along the perimeter edge 114. The receiving portion 126 may be demarcated by a visual marking or a physical marking. In some embodiments, the receiving portion 126 may be recessed into the board 104 so as to better contain the game pieces placed therein. In other embodiments, the receiving portion 126 may be a tray on top of the board 104 or on the edge 114.

In some embodiments, the receiving portion 126 may comprise a sensor 128 to determine which of the game pieces 106 were placed on the receiving portion 126. The sensor 128 can be used to determine whether the correct number and type of game pieces were placed in the receiving portion 126 in relation to the instruction given. Thus, the sensor 128 may also be operatively connected to the communication device 122. For example, the sensor 128 may be a scale to weigh the game pieces 106 placed in the receiving portion 126. Each game piece 106 may have a unique weight associated with it so that when an instruction is given, the correct answer will result in a unique total weight. The communication device 122 may time the player and consider the total weight after a predetermined time, or the player may indicate to the communication device when he or she has completed the instruction and is ready for the reading to be taken.

In some embodiments, the sensor 128 may be an optical sensor 130, such as a scanner or camera to optically determine which game pieces 106 were placed in the receiving portion 126 by reading a marking on the game piece 106, such as a bar code, or detecting the physical shape, size, dimension, or any other unique visible characteristic of the game pieces 106. In such an embodiment, the educational tool 100 would not require a receiving portion 126 as the players could simply have the game pieces 106 scanned and placed in a generic discard pile off the board 104. The optical sensor 130 may be an external device relative to the communication device 122 or integrally part of the communication device 122.

The educational tool 100 may further comprise a plurality of game pieces 106. In embodiments in which the communication device 122 is a multimedia player, the game pieces 106 may be displayed electronically on the communication device 122. Preferably, the game pieces 106 are tangible physical pieces that can be picked up and examined by the players. The game pieces 106 may come in a variety of forms, types, and denominations. In one example, the game pieces 106 may be money, such as bills and coins.

Depending on the type of learning experience desired, the game pieces 106 may be randomly positioned on the top surface 112 or systematically arranged on the top surface 112. Preferably, since the positions 118 are arranged adjacent to the perimeter edge 114 of the board 104, the game pieces 106 are placed centrally inwardly relative to the plurality of positions 118. For example, on a circular board 104, the game pieces 106 are positioned radially inward relative to the plurality of positions 118. However, during the setup of a game, the game pieces 106 would be placed outside the receiving portion 126.

The game pieces 106 are configured to be removable from the top surface 112 and placed into the receiving portion 126. The game pieces 106 may comprise a means for temporarily and reversibly fastening the game piece 106 to the board 104. For example, the game pieces 106 may comprise a magnet or be magnetized. Alternatively, the game pieces 106 may comprise an adhesive, hook and loop fasteners, buttons, pegs or holes, and the like that is reciprocal to the fastening mechanism used on the board 104.

The education tool may further comprise a plurality of player pieces 108 positionable on the board 104 and configured to be moved from position 118*a* to position 118*b* so the player knows which actuators 120 to actuate on his or her turn in response to the random number generator. Therefore, the player pieces 108 may also comprise an adhesive, hook and loop fasteners, buttons, pegs or holes, and the like, to be temporarily and reversibly fastened to the positions 118. In turn, the positions 118 have the reciprocal fastening mechanism to temporarily and reversibly fasten the player pieces 108.

In some embodiments, player pieces 108 are not necessary. Rather, each player may sit at one of the plurality of positions 118 as his or her designated spot. On the player's turn, the player simply presses the actuator 120 and receives instruction on what to do with the game pieces 106. In such embodiments, even the plurality of positions 118 and the random number generator are not required.

EXAMPLES

Due to the configuration of the board 104, multiple different types of skills and knowledge in a variety of different fields may be acquired. By way of example only, the educational tool 100 may be used to teach the players how to count money. A circular dome-shaped board 104 may be provided with a plurality of positions 118 uniformly spaced apart along the perimeter edge 114 of the top surface 112 on the board 104. Various denominations of currency, such as bills and coins may be used as the game pieces 106 and randomly distributed on the board 104, radially inwardly relative to the positions 118. All players may begin at the same starting point. A player actuates the random number generator (i.e. rolls standard die, spins a standard spinner, or actuates an electronic random number generator on the communication device 122) and moves his player piece 108 the designated number of spaces. The player can then actuate the actuator 120*a* adjacent to the position 118*a* landed on and receive the instruction. The communication device 122 gives instruction to the player to gather a specific amount of money. For example, the instruction may be to "collect twenty-seven cents with three coins." The player then looks on the board 104 and figures out which coins will be required to collect in order to get the correct quantity and amount requested on the instruction. Once the player thinks he or she has the proper coins, the player places the collected money on the receiving portion 126. The sensor 128 on the receiving portion reads, measures, or weighs the coins placed in the receiving portion 126 and the communication device 122 calculates the exact amount collected and determines whether the player has executed the instruction correctly. The communication device 122 announces whether the instruction was executed correctly. Alternatively, a neutral party can determine whether the instruction had been executed correctly. If correct, the player may go again. Otherwise, the next player takes a turn.

In another embodiment, the communication device 122 may display a typical menu from a fast food restaurant listing the items for sale and their corresponding price. A player actuates the random number generator (i.e. rolls standard die, spins a standard spinner, or actuates an electronic random number generator on the communication device 122) and moves his player piece the designated number of spaces. Upon activating the actuator 120, the communication device 122 may request the player to collect sufficient money to purchase a specific item on the menu. The player will have to identify the item in the menu, figure out the corresponding price, then collect the exact amount and place it into the receiving portion 126. The receiving portion 126 sends its reading to the communication device 122 to determine whether the correct amount is placed in the receiving portion 126. The communication device 122 then notifies the player whether the amount is correct or not.

In another embodiment, the educational tool 100 may test spelling or letter recognition. A plurality of letters from the alphabet may be randomly distributed on the top surface 112 of the board 104 as the game pieces 106. On a player's turn, the player actuates the random number generator (i.e. rolls standard die, spins a standard spinner, or actuates an electronic random number generator on the communication device 122). The communication device 122 announces a word or shows a picture. The player then collects the letters in the proper sequence that spells the word or subject matter of the picture and places the letters into the receiving portion 126 in the proper sequence. The sensor 128 reads the game pieces 106 and sends the information to the communication device 122. The communication device 122 determines whether the word was spelled correctly based on the sequence with which each letter was placed in the receiving portion 126 or optically read by the optical sensor 130.

The educational tool of the present invention can be used to teach a subject matter including, but not limited to, history, any foreign language, English language arts, all branches of mathematics, geography, all branches of science, all recognition skills, social skills, business skills (including all business applications such as real estate, accounting, retail and wholesale applications), any and all applications that apply to the legal profession and to all aspects of the medical profession and any and all educational and non-educational games and activities including security professionals and law-enforcement and the military. The game board, without further modification, can be used to facilitate training in all areas of education, business, the government, and military, including all of the above-mentioned locations and professions.

Software applications can be created with rules and instructions for whatever game type the players to play as well as varying difficulty levels. All that is required to change the game for a new training regime is to clear the board of the game pieces and place new game pieces relevant to the new game on the board, and follow the rules for the new game or open the application on the communication device 122 pertaining to the new game.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. An educational tool, comprising:
   a. base;
   b. a circular board rotatably mounted on the base, the circular board comprising:
      i. a top surface having a center and terminating at a perimeter edge, wherein the to surface is magnetic,
      ii. a bottom surface opposite the top surface, the bottom surface mounted on the base,
      iii. a plurality of positions on the top surface uniformly and angularly spaced apart along the perimeter edge,
      iv. a plurality of actuators on the top surface, one actuator adjacent to one position, and
      v. a receiving portion positioned on the top surface radially inwardly relative to the plurality of positions;
   c. a plurality of game pieces randomly positioned on the top surface radially inwardly relative to the plurality of positions, wherein each game piece is magnetized;
   d. a plurality of player pieces positionable on the board;
   e. a communication device operatively connected to each actuator, wherein actuation of any actuator activates the communication device to give a specific instruction regarding the game piece; and
   f. a random number generator.

2. The educational tool of claim 1, wherein the communication device comprises an audio component to give oral instructions.

3. The education tool of claim 1, wherein the communication device comprises a visual component to give visual instuctions.

4. The educational tool of claim 3, wherein the visual component is a touch screen located at the center of the board.

5. The educational tool of claim 1, wherein the receiving portion comprises a sensor to determine which of the game pieces were placed on the receiving portion.

6. Th educutional tool of claim 1, wherein the communication device comprises an optical sensor to determine whether the specific instruction was executed correctly.

7. The educational tool of claim 1, wherein the board further comprises at least two pieces fastened together with a hinge to make the board foldable.

8. An educational at tool, comprising:
   a. a base;
   b. a board rotatably mounted the base, the board comprising:
      i. a top surface having a center and terminating at at least one perimeter edge,
      ii. a bottom surface opposite the top surface, the bottom surface mounted on the base,
      iii. a plurality of positions on the top surface uniformly spread along the at least one perimeter edge,
      iv. a plurality actuators, one actuator adjacent to one position, and
      v. a receiving portion positioned on the top surface,
      vi. wherein the board further comprises at least two pieces connected together by a hinge for the board to be foldable;
   c. a plurality of game pieces positionable on the top surface centrally inwardly relative to at least one of the plurality of positions, but outside the receiving portion, wherein each game piece is configured to reversibly fasten to the top surface;
   d. a plurality of player pieces positionable on the board; and
   e. a communication device operatively connected to each actuator, wherein actuation of any actuator activates the communication device to give a specific instruction regarding the game piece.

9. The educational tool of claim 8. wherein the to surface is magnetized,

10. The educational tool of claim 8, wherein the game pieces are randomly distributed on the to surface.

11. The educational tool of claim 8, wherein the communication device comprises an audio component to give oral instructions.

12. The education tool of claim 8, wherein the communication device comprises a visual component to give visual instructions.

13. The educational tool of claim 12, wherein the visual component comprises a touch screen.

14. The educational tool of claim 8, wherein the communication device is a computing device comprising a processor and memory, wherein the computing device is configured to give the specific instruction in response to actuation of one of the actuators, and wherein the actuator communicates with the communication device wirelessly.

15. The education tool of claim 8, wherein the communication device comprises a sensor to determine whether the specific instruction was executed correctly.

16. The educational tool of claim 8, wherein the receiving portion comprises a sensor to determine which of the game pieces were placed on the receiving portion.

17. A method for teaching, comprising:
   a. providing an educational device, comprising:
      i. a base;
      ii. a board rotatably mounted on the base, the board comprising:

(a) a top surface having a center and terminating at at least one perimeter edge,
(b) a bottom surface opposite the top surface, the bottom surface mounted on the base,
(c) a plurality of positions on the top surface uniformly spread along the at least one perimeter edge,
(d) a plurality of actuators, one actuator adjacent to one position, and
(e) receiving portion positioned on the top surface centrally inwardly relative to at least one of the plurality positions;

iii. a plurality of game pieces positionable on the top surface centrally inwardly relative to at least one of the plurality of positions, wherein each game piece comprises a reversible fastening mechanism;
iv. a plurality of player pieces positionable on the board;
v. a communication device operatively connected to each actuator, wherein actuation of any actuator activates the communication device to give a specific instruction regarding the game piece;

b. providing a random number generator actuatable by the players to determine a number of positions to move the player pieces, in turn;
c. giving an instruction to a first player in response to each actuation of one of the plurality of actuators corresponding to one of the plurality of positions landed on by the first player in response to actuation of the random number generator;
d. determining whether the instruction was executed correctly, and
e. rotating the board to accommodate a next player.

18. The method of claim 17, wherein the communication device is an electronic computing device.

19. The method of claim 18, wherein the random number generator is provided by the communication device.

20. The method of claim 17, wherein determining whether the instruction was executed correctly is determined by a sensor.

* * * * *